United States Patent
Armstrong et al.

(10) Patent No.: US 7,111,200 B2
(45) Date of Patent: Sep. 19, 2006

(54) APPARATUS AND METHOD FOR DEBUGGING A LOGICAL PARTITION

(75) Inventors: Troy David Armstrong, Rochester, MN (US); William Joseph Armstrong, Rochester, MN (US); Tracy Bashore, Rochester, MN (US); George F. Eckman, Oronoco, MN (US); Naresh Nayar, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 581 days.

(21) Appl. No.: 10/418,323

(22) Filed: Apr. 17, 2003

(65) Prior Publication Data

US 2004/0221200 A1 Nov. 4, 2004

(51) Int. Cl.
*G06F 11/00* (2006.01)
*G06F 11/36* (2006.01)

(52) U.S. Cl. .............................. 714/34; 714/38; 714/46
(58) Field of Classification Search ................... 714/34
See application file for complete search history.

(56) References Cited

U.S. PATENT DOCUMENTS

| | | | | |
|---|---|---|---|---|
| 5,398,196 A | * | 3/1995 | Chambers | 714/28 |
| 5,561,761 A | * | 10/1996 | Hicok et al. | 714/30 |
| 6,711,660 B1 | * | 3/2004 | Milne et al. | 711/173 |
| 6,711,700 B1 | * | 3/2004 | Armstrong et al. | 714/23 |
| 6,839,892 B1 | * | 1/2005 | Dawkins et al. | 717/124 |
| 6,845,470 B1 | * | 1/2005 | Austen et al. | 714/38 |
| 6,961,806 B1 | * | 11/2005 | Agesen et al. | 711/6 |
| 7,024,581 B1 | * | 4/2006 | Wang et al. | 714/2 |

OTHER PUBLICATIONS

Practical C++ Programming by Steve Oualline Published by O'Reilly Dec. 2002 ISBN 0-596-00419-2.*
Debugging by Phil Burk http://home.tampabay.rr.com/jforth/C13_Debugging.html Oct. 8, 1999 version found via the WayBack Machine.*

* cited by examiner

*Primary Examiner*—Bryce P. Bonzo
*Assistant Examiner*—Joseph Schell
(74) *Attorney, Agent, or Firm*—Martin & Associates, LLC; Derek P. Martin

(57) ABSTRACT

A logical partition debugger allows debugging one logical partition in a computer system without requiring the shutdown of other logical partitions. The logical partition debugger is implemented in software in the partition manager. The logical partition debugger provides many common debug functions known in existing hardware and software debuggers, but does so in a manner that only the partition being debugged is affected.

36 Claims, 11 Drawing Sheets

APPARATUS AND METHOD FOR DEBUGGING A LOGICAL PARTITION

BACKGROUND OF THE INVENTION

1. Technical Field

This invention generally relates to data processing, and more specifically relates to logically partitioned computer systems.

2. Background Art

Since the dawn of the computer age, computer systems have evolved into extremely sophisticated devices that may be found in many different settings. Computer systems typically include a combination of hardware (e.g., semiconductors, circuit boards, etc.) and software (e.g., computer programs). As advances in semiconductor processing and computer architecture push the performance of the computer hardware higher, more sophisticated computer software has evolved to take advantage of the higher performance of the hardware, resulting in computer systems today that are much more powerful than just a few years ago.

The combination of hardware and software on a particular computer system defines a computing environment. Different hardware platforms and different operating systems thus provide different computing environments. In recent years, engineers have recognized that it is possible to provide different computing environments on the same physical computer system by logically partitioning the computer system resources to different computing environments. The eServer computer system developed by IBM is an example of a computer system that supports logical partitioning. If logical partitioning on an eServer computer system is desired, partition manager code (referred to as a "hypervisor" in eServer terminology) is installed that allows defining different computing environments on the same platform. Once the partition manager is installed, logical partitions may be created that define different computing environments. The partition manager manages the logical partitions to assure that they can share needed resources in the computer system while maintaining the separate computing environments defined by the logical partitions.

A computer system that includes multiple logical partitions typically shares resources between the logical partitions. For example, in a computer system with a single CPU, two logical partitions could be defined that allocates 50% of the CPU to each partition, that allocates 33% of the memory to the first partition and 67% of the memory to the second partition, and that allocates two different I/O slots to the two logical partitions, one per partition. Once logical partitions are defined and shared resources are allocated to the logical partitions, each logical partition acts as a separate computer system. Thus, in the example above that has a single CPU with two logical partitions in a computer system, the two logical partitions will appear for all practical purposes to be two separate and distinct computer systems.

An issue that arises with any computer system is how to perform debug functions. Software debuggers are known, but require that the computer system properly boot before the software debugger may be executed. A software debugger is thus useless to debug failures that occur while the computer system is booting. Hardware debuggers are also know in the art. In known eServer computer systems, a separate processor known as a service processor is coupled to the main processors and memory. The service processor may typically execute even if the computer system fails to boot. A hardware debugger in the service processor may thus be used to detect bugs in the computer system as the computer system boots up. The hardware debugger allows a user to set breakpoints and perform other debug functions, such as examining and altering the contents of memory. This typically requires that all processors in the computer system be stopped.

In a logically partitioned computer system, each partition provides a separate and distinct computing environment. If debugging is required on one logical partition, it may be undesirable to stop all processors, because other logical partitions on the system will have to stop even though they have no problems that need to be debugged. For this reason, the prior art hardware debugger may not be suitable for debugging problems in a single logical partition, because all logical partitions have to be stopped to use the hardware debugger. Without a way to debug a logical partition without requiring other logical partitions to stop, the computer industry will continue to suffer from inefficient debug mechanisms and methods for logically partitioned computer systems.

DISCLOSURE OF INVENTION

A logical partition debugger allows debugging one logical partition in a computer system without requiring the shutdown of other logical partitions. The logical partition debugger is implemented in software in the partition manager. The logical partition debugger provides many common debug functions known in existing hardware and software debuggers, but does so in a manner that only the partition being debugged is affected.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

According to preferred embodiments of the present invention, a logical partition debugger executes external to a plurality of logical partitions, preferably in a partition manager. The logical partition debugger performs one or more debug functions for one logical partition without affecting other logical partitions. The debugger uses functions provided by the partition manager to map virtual addresses to real addresses, and to start and stop virtual processors for a selected logical partition. In this manner one logical partition may be debugged without affecting other logical partitions.

Figure 1:
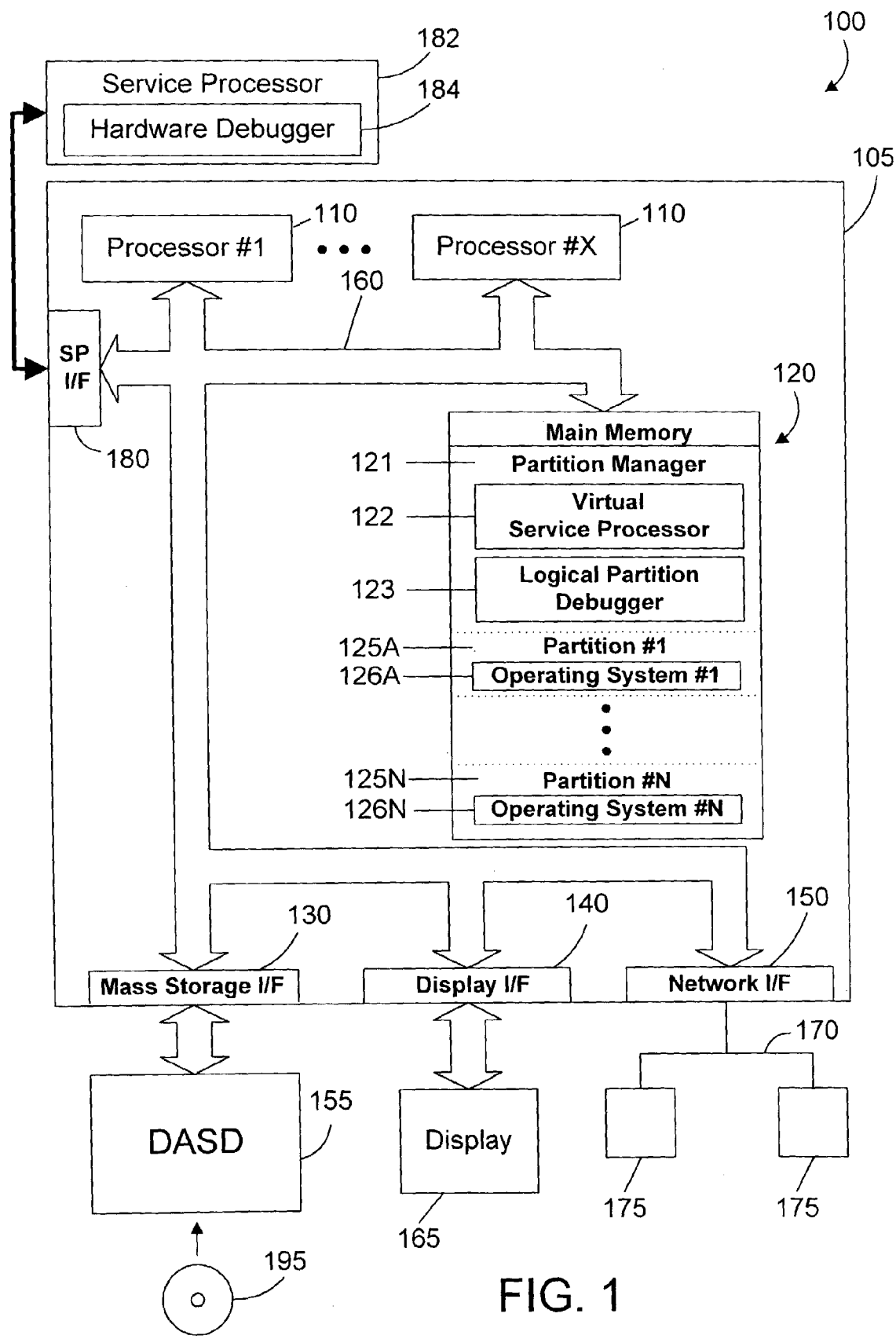
FIG. 1 is a block diagram of a computer apparatus that supports debugging of logical partitions in accordance with the preferred embodiments.

Referring to FIG. 1, a computer system 100 is an enhanced IBM eServer computer system, and represents one suitable type of computer system that supports logical partitioning and debugging in accordance with the preferred embodiments. Those skilled in the art will appreciate that the mechanisms and apparatus of the present invention apply equally to any computer system that supports logical partitions. As shown in FIG. 1, computer system 100 comprises one or more processors 110 connected to a main memory 120, a mass storage interface 130, a display interface 140, a network interface 150, and a service processor interface 180. These system components are interconnected through the use of a system bus 160. Mass storage interface 130 is used to connect mass storage devices (such as a direct access storage device 155) to computer system 100. One specific type of direct access storage device is a CD RW drive, which may read data from aCDRW 195.

Service processor interface 180 preferably connects the core portion 105 of computer system 100 with a separate service processor 182. Service processor 182 preferably includes a hardware debugger 184 that allows debugging even if core portion 105 does not boot up correctly. In other words, the service processor 182 may function even if the core portion 105 of computer system 100 is not functional. Service processor 182 typically provides a user interface to its hardware debugger 184 that allows a user to perform traditional debug functions for computer system 100.

Main memory 120 contains a partition manager 121 and N logical partitions 125, shown in FIG. 1 as logical partitions 125A through 125N. Partition manager 121 preferably creates these N logical partitions 125. Each logical partition preferably includes a corresponding operating system 126, shown in FIG. 1 as operating systems 126A through 126N. Operating system 126 is a multitasking operating system, such as OS/400, AIX, or Linux; however, those skilled in the art will appreciate that the spirit and scope of the present invention is not limited to any one operating system. Any suitable operating system can be used. Operating system 126 is a sophisticated program that contains low-level code to manage the resources of computer system 100. Some of these resources are processor 110, main memory 120, mass storage interface 130, display interface 140, network interface 150, service processor interface 180, and system bus 160. The operating system 126 in each partition may be the same as the operating system in other partitions, or may be a completely different operating system. Thus, one partition can run the OS/400 operating system, while a different partition can run another instance of OS/400, possibly a different release, or with different environment settings (e.g., time zone). The operating systems in the logical partitions could even be different than OS/400, provided it is compatible with the hardware (such as AIX or Linux). In this manner the logical partitions can provide completely different computing environments on the same physical computer system.

The partitions 125A–125N are shown in FIG. 1 to reside within the main memory 120. However, one skilled in the art will recognize that a partition is a logical construct that includes resources other than memory. A logical partition typically specifies a portion of memory, along with an assignment of processor capacity and other system resources. Thus, one partition could be defined to include two processors and a portion of memory 120, along with one or more I/O processors that can provide the functions of mass storage interface 130, display interface 140, or network interface 150. Another partition could then be defined to include three other processors, a different portion of memory 120, and one or more I/O processors. The partitions are shown in FIG. 1 to symbolically represent logical partitions, which would include system resources outside of memory 120 within computer system 100. Note also that the partition manager 121 preferably resides in memory and hardware separate from the partitions and are facilities and mechanisms that are not directly available to the partitions.

Partition manager 121 preferably includes a virtual service processor 122 and a logical partition debugger 123. Virtual service processor 122 provides many control functions for the logical partitions, such as the ability to stop and start virtual processors within a logical partition. The logical partition debugger 123 provides debug functions that allow debugging one logical partition without affecting other logical partitions, and may use one or more functions provided by the virtual service processor 122. The logical partition debugger 123 provides many of the same functions and features as the hardware debugger 184 in the service processor 182, but does so in a way that allows non-affected partitions to continue to operate while debugging a target partition. In FIG. 1, the virtual service processor 122 and logical partition debugger 123 are shown as part of the partition manager 121, which is the most preferred embodiment. Note, however, that the present invention expressly extends to any implementation of a debug mechanism external to the logical partitions, whether residing in the partition manager, executed under control of the partition manager, or executing independently from the partition manager while communicating with the partition manager.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while the partition manager 121 and the partitions 125A–125N are shown to reside in main memory 120, those skilled in the art will recognize that these items are not necessarily all completely contained in main memory 120 at the same time. It should also be noted that the term "memory" is used herein to generically refer to the entire virtual memory of computer system 100.

Each processor 110 may be constructed from one or more microprocessors and/or integrated circuits. A processor 110 executes program instructions stored in main memory 120. Main memory 120 stores programs and data that processors 110 may access. When computer system 100 starts up, a processor 110 initially executes the program instructions that make up the partition manager 121, which initializes the operating systems in the logical partitions.

Although computer system 100 is shown to contain only a single system bus, those skilled in the art will appreciate that the present invention may be practiced using a computer system that has multiple buses. In addition, the I/O interfaces that are used in the preferred embodiment each may include separate, fully programmed microprocessors that are used to off-load compute-intensive processing from processor 110, as in eServer input/output processors, or may be simple industry standard I/O adapters (IOAs).

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of computer readable signal bearing media used to actually carry out the distribution. Examples of suitable signal bearing media include: recordable type media such as floppy disks and CD RW (e.g., 195 of FIG. 1), and transmission type media such as digital and analog communications links.

Figure 2:
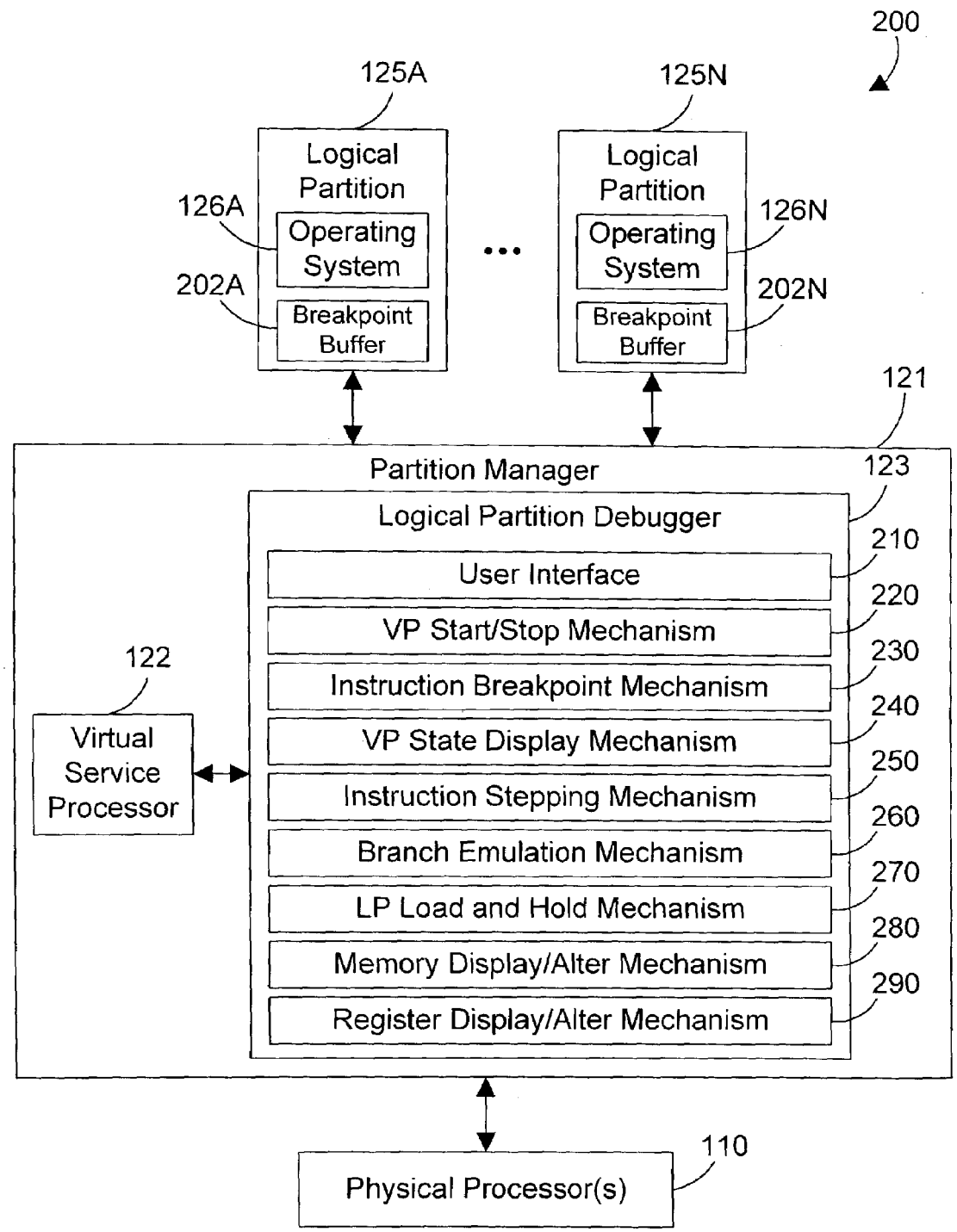
FIG. 2 is a block diagram showing a logical view of some of the components in FIG. 1 in accordance with the preferred embodiments.

FIG. 1 shows a sample computer system that shows some of the salient features of both hardware and software in accordance with the preferred embodiments. A more detailed logical view of some of the components in FIG. 1 is shown as system 200 in FIG. 2. Each logical partition 125 includes an operating system 126, and defines one or more breakpoint buffers 202. In FIG. 2, logical partition 125A is shown to contain breakpoint buffer 202A, while logical partition 125N is shown to contain breakpoint buffer 202N. In addition, each logical partition may include from 1 to any suitable number of virtual processors. These virtual processors may have dedicated physical processors, or may share physical processors.

The logical partitions 125 communicate with partition manager 121. Partition manager 121 manages the logical partitions. One suitable implementation for partition manager 121 is referred to as a "hypervisor" in IBM terminology. Partition manager 121 manages the logical partitions by deciding when a virtual processor in a logical partition is dispatched to a physical processor 110. Partition manager 121 preferably includes a virtual service processor 122 that controls the operation of the logical partition debugger 123. As shown in FIG. 2, the logical partition debugger 123 may include any or all of the following: user interface 210; virtual processor start/stop mechanism 220; instruction breakpoint mechanism 230; virtual processor state display mechanism 240; instruction stepping mechanism 250; branch emulation mechanism 260; logical partition load and hold mechanism 270; memory display/alter mechanism 280; and register display/alter mechanism 290. The function of each of items 210–290 is discussed in detail below.

Figure 3:
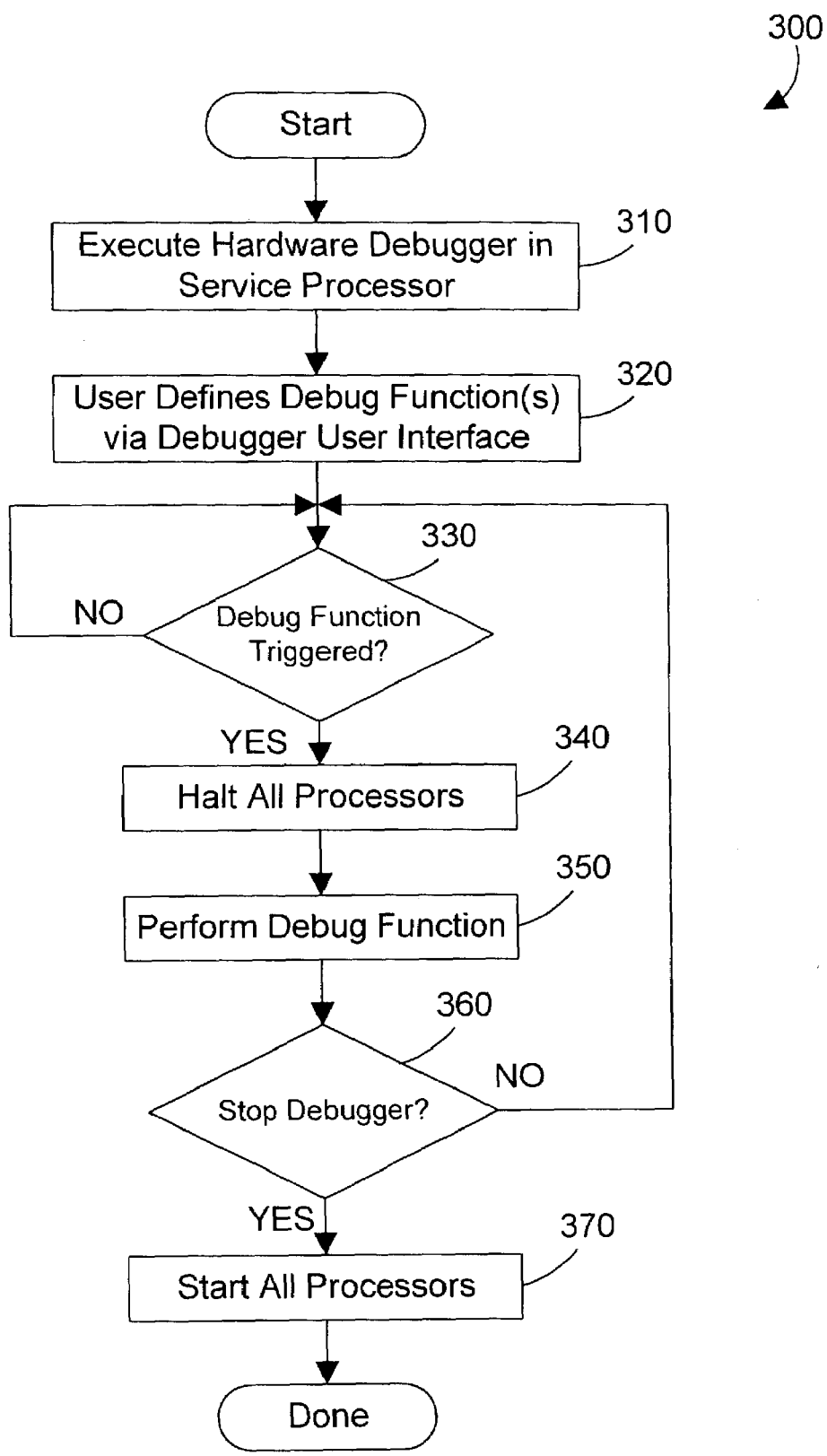
FIG. 3 is a flow diagram of a prior art method for debugging a computer system using a known hardware debugger.

Referring to FIG. 3, a prior art method 300 represents steps performed by a hardware debugger, such as hardware debugger 184 in a service processor 182 in FIG. 1. The hardware debugger is executed in the service processor (step 310). The hardware debugger provides a user interface that allows a user to define one or more debug functions (step 320). Method 300 then waits (step 330=NO) until a debug function is triggered (step 330=YES). Once a debug function is triggered, all processors are halted (step 340), and the debug function is then performed (step 350). If there are more debug functions to perform (step 360=NO), control passes to step 330. When the debugger is to be stopped (step 360=YES), all processors are re-started (step 370), and method 300 is done.

A significant problem with prior art method 300 is that it requires halting all physical processors (e.g., 110 in FIG. 1) in the system. In a logically partitioned computer system, this means that all logical partitions must be stopped. This is a very undesirable side effect of using the hardware debugger, because it may be unacceptable to stop all logical partitions to debug a problem in only one of the logical partitions. The present invention solves this problem by allowing debugging of one logical partition while other logical partitions continue operating.

Figure 4:
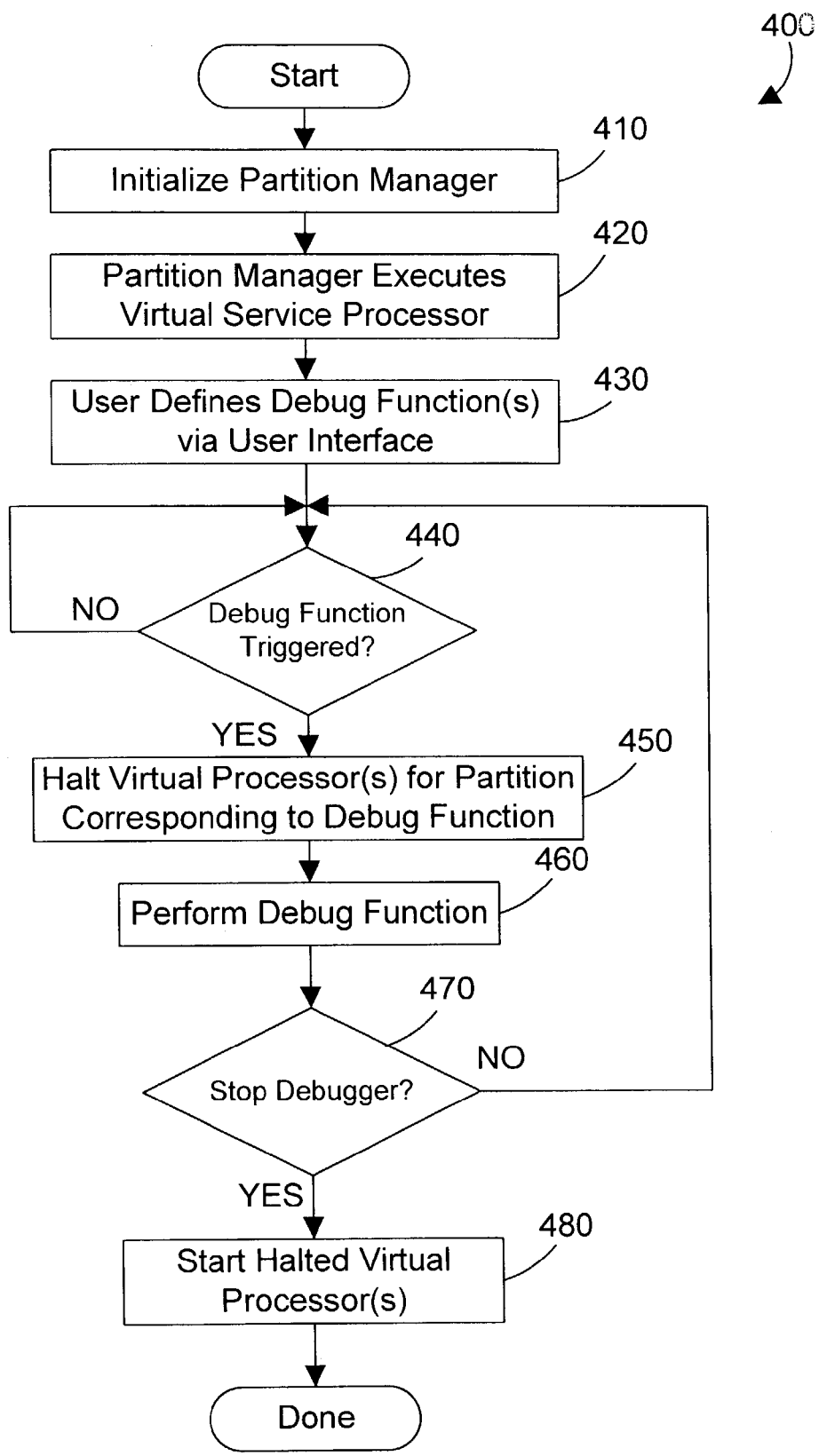
FIG. 4 is a flow diagram of a method in accordance with the preferred embodiments for debugging a logical partition in a computer system without halting the processors for all logical partitions.

Referring to FIG. 4, a method 400 in accordance with the preferred embodiments begins by initializing the partition manager (step 410). Once the partition manager is up and running, it executes the virtual service processor (step 420). Once the VSP is running, a user may use the user interface 210 in the logical partition debugger 123 to define one or more debug functions (step 430). Method 400 then waits (step 440=NO) until a debug function is triggered (step 440=YES). Once a debug function is triggered, one or more virtual processors in the logical partition affected by the debug function are halted (step 450). In the most preferred implementation, all virtual processors for the affected logical partition are halted in step 450, but the preferred embodiments expressly extend to halting fewer than all of the virtual processors in a logical partition. Note that only the virtual processor(s) in the logical partition affected by the triggered debug function are halted. Virtual processors in all other logical partitions continue operating as normal. The debug function is then performed (step 460). If there are more debug functions to perform (step 470=NO), control passes to step 440. When the debugger is to be stopped (step 470=YES), the halted virtual processor(s) are re-started (step 480), and method 400 is done.

A significant difference between prior art method 300 and method 400 of the preferred embodiments is that method 400 only affects a single logical partition, the one affected by the triggered debug function. All other logical partitions continue to operate normally. Method 400 thus allows debugging one logical partition without shutting down the other logical partitions on the system, which is required in prior art method 300. In addition, method 400 allows defining debug functions (such as breakpoints) for multiple logical partitions. When a debug function is triggered, the virtual processors for the logical partition corresponding to the debug function are halted while the other logical partitions continue to run. In this manner, sophisticated debugging across multiple logical partitions may be performed.

Figure 5:
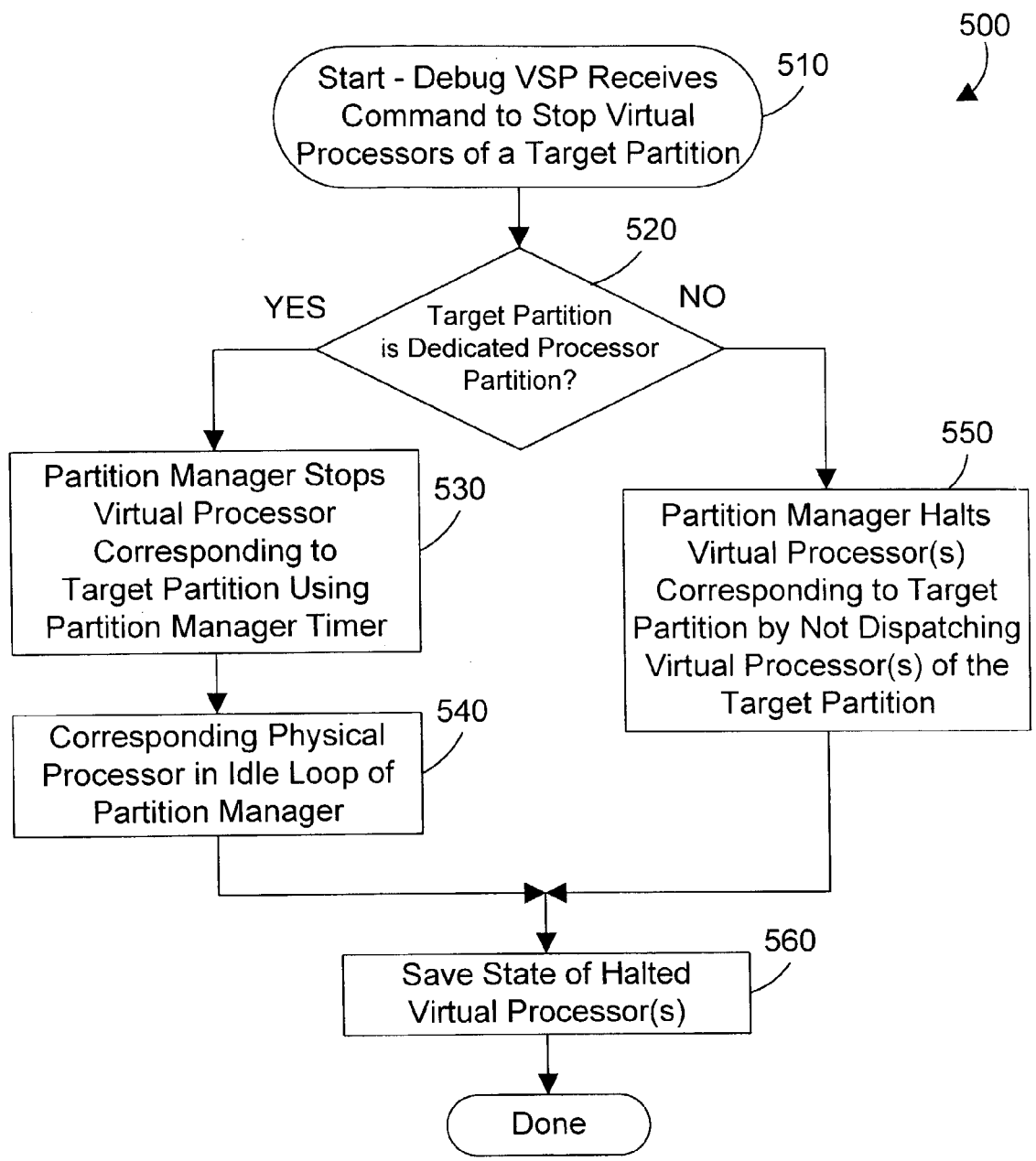
FIG. 5 is a flow diagram of a method in accordance with the preferred embodiments for stopping the virtual processors of a target partition.
Figure 6:
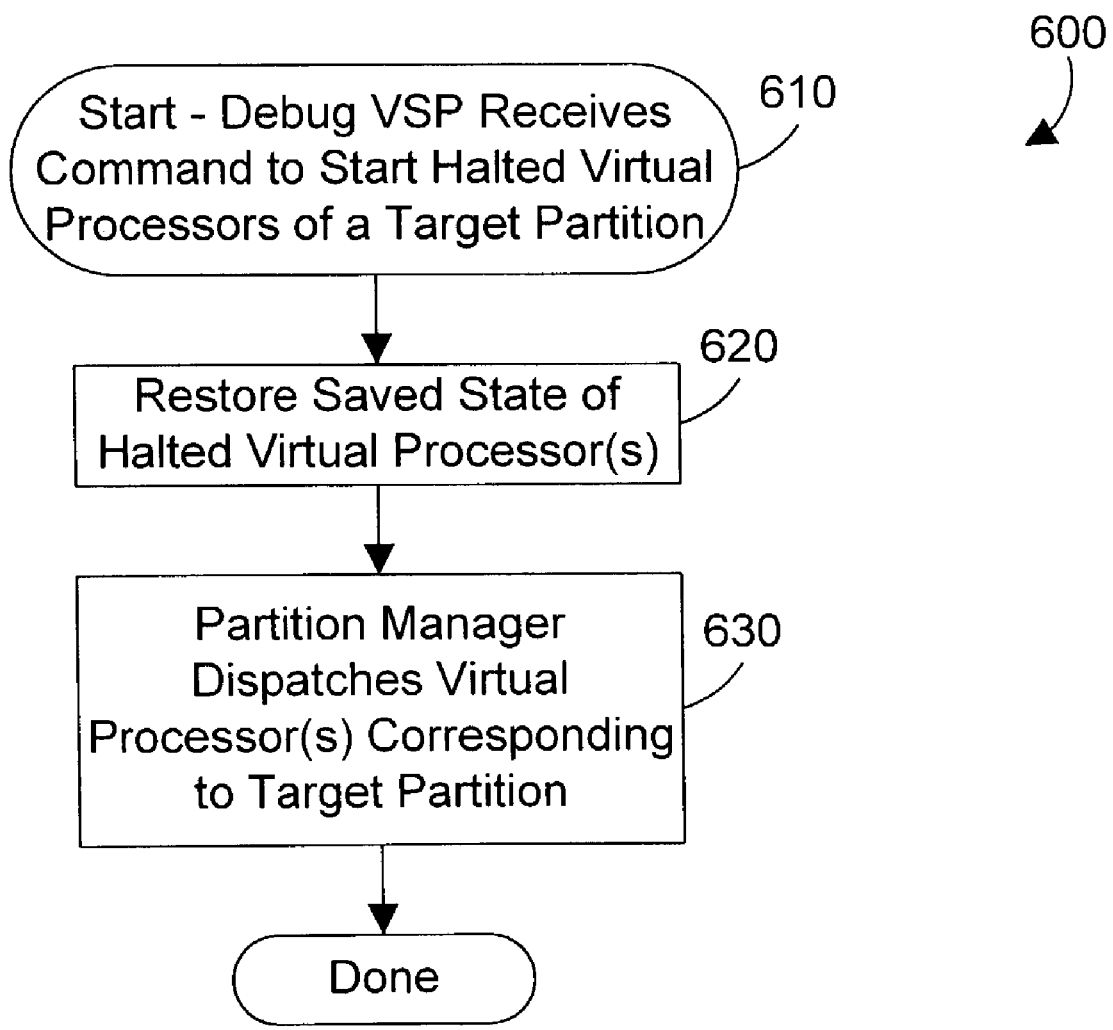
FIG. 6 is a flow diagram of a method in accordance with the preferred embodiments for starting the virtual processors of a target partition.

Functions of the virtual processor start/stop mechanism 220 in FIG. 2 are shown as methods 500 and 600 in FIGS. 5 and 6, respectively. Method 500 in FIG. 5 is preferably commenced when the virtual service processor receives a command to stop the virtual processors of a target partition (step 510). This command may come from a user via the user interface 210, may come from the partition manager 121, or may come from an event that occurs within the virtual service processor 122. If the target partition is a dedicated processor partition (step 520=YES), the partition manager stops the virtual processor corresponding to the target partition using a timer in the partition manager (step 530). The processor preferably includes a timer to allow the hypervisor to get control over the logical partitions. Once the hypervisor has control, it may halt the virtual processor corresponding to the target partition by placing its dedicated physical processor in an idle loop (step 540). If the target partition is not a dedicated processor partition (step 520=NO), this means that the target partition is a shared processor partition. The partition manager halts one or more virtual processors corresponding to the target partition by simply not dispatching these virtual processors to the hardware for execution (step 550). Once the dedicated processor has been halted in steps 530 and 540 or the virtual processor(s) in step 550 have been halted, the state of the halted virtual processor(s) is saved (step 560). Saving the state of the halted virtual processors is required so the state may be restored when the virtual processors are restarted later.

Method 600 in FIG. 6 shows the steps that are preferably performed when the virtual service processor receives a command to start halted virtual processors of a target partition (step 610). The saved state of the halted virtual processors is restored (step 620). The partition manager then dispatches the virtual processor(s) corresponding to the target partition to one or more physical processors for execution (step 630).

Figure 7:
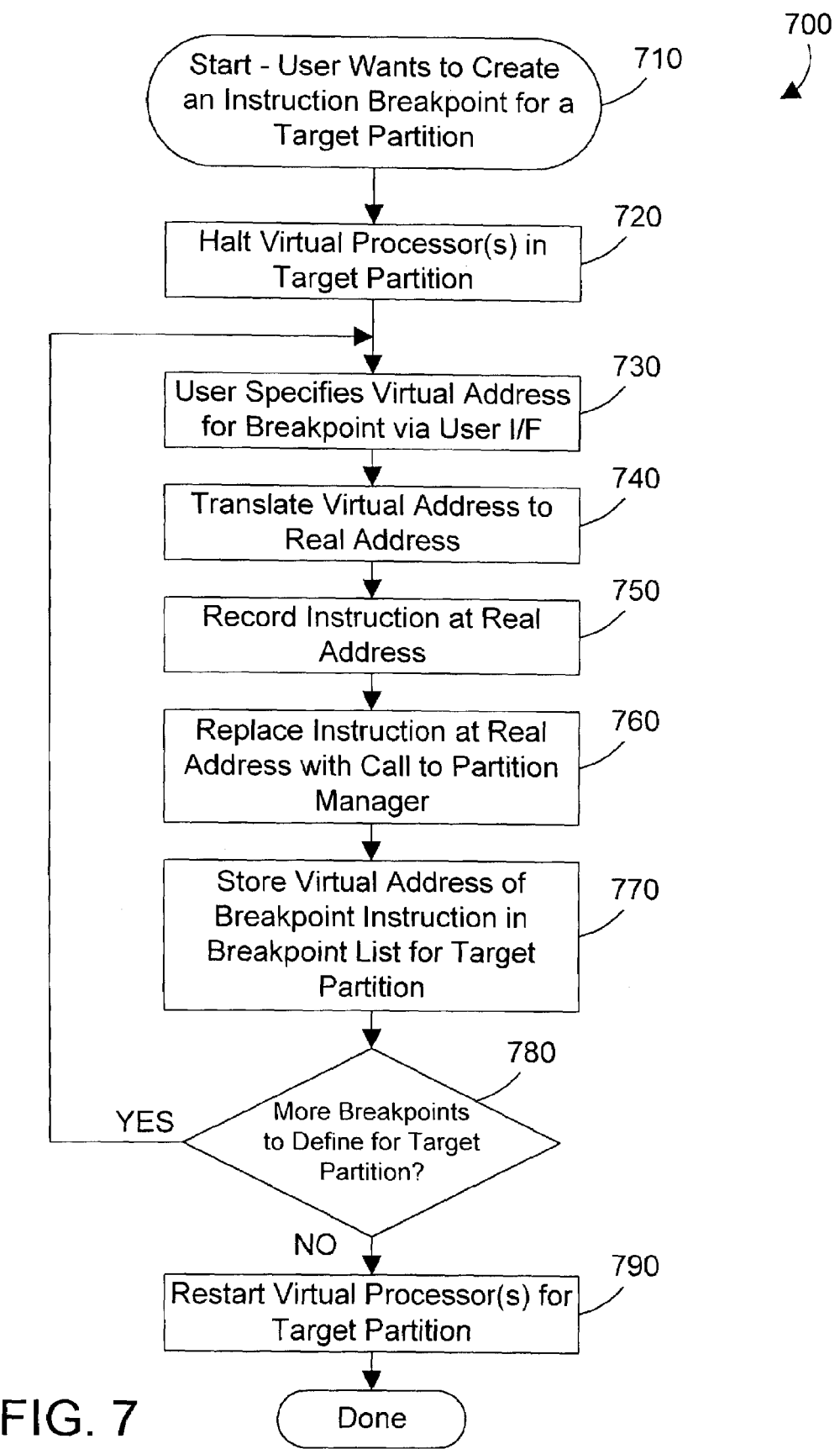
FIG. 7 is a flow diagram of a method in accordance with the preferred embodiments for setting an instruction breakpoint in a target partition.
Figure 8:
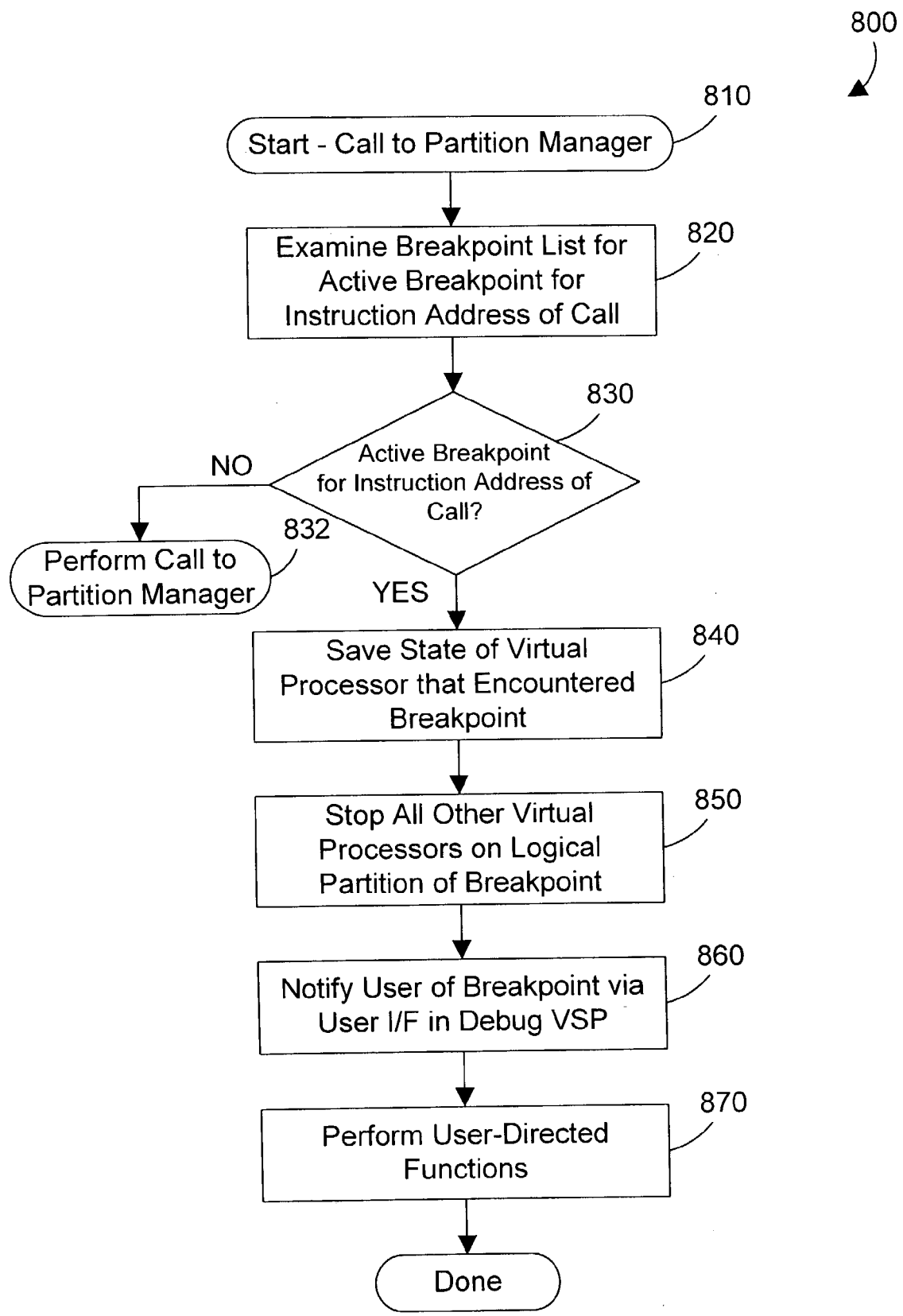
FIG. 8 is a flow diagram of a method in accordance with the preferred embodiments for processing a breakpoint instruction in a target partition when the breakpoint instruction is executed.

Functions of the instruction breakpoint mechanism 230 in FIG. 2 are shown as methods 700 and 800 in FIGS. 7 and 8, respectively. Method 700 in FIG. 7 includes the steps in defining one or more breakpoints. Method 800 in FIG. 8 includes the steps in processing a breakpoint when it occurs. Method 700 begins when a user wants to create an instruction breakpoint for a target partition (step 710). One or more virtual processors in the target partition are halted by the virtual service processor (step 720). Note that step 720 could simply invoke method 500 in FIG. 5 to stop the virtual processor(s) in the target partition. Once the virtual processors are halted, the user may specify a virtual address for a breakpoint via the user interface (step 730). Note that the virtual address is the address in the partition, which is controlled by the partition manager, so the virtual service processor uses the address translation tables in the partition manager to translate the virtual address to the corresponding real address (step 740). The instruction at the real address is then recorded (step 750), and that instruction is replaced with a call to the partition manager (step 760). The virtual address of the breakpoint instruction is then stored in a breakpoint list that corresponds to the target partition (step 770). If there are more breakpoints to define for the target partition (step 780=YES), control passes to step 730. Once there are no more breakpoints to define for the target partition (step 780=NO), the virtual processor(s) corresponding to the target partition are restarted (step 790). Note that step 790 could simply invoke method 600 in FIG. 6 to restart the virtual processors in the target partition. Also note that method 700 could be repeated for multiple logical partitions to allow setting breakpoints in more than one logical partition at a time.

An instruction breakpoint in the preferred embodiments is defined by an instruction that has been replaced by a call to the partition manager. Referring to FIG. 8, method 800 thus commences when a call to the partition manager is made (step 810).

The breakpoint list is examined to determine if the instruction address of the call to the partition manager is listed as an active breakpoint (step 820). If no active breakpoint is defined for the instruction address of the call (step 830=NO), the call to the partition manager is not a breakpoint, so the partition manager call is performed by the partition manager in its usual manner (step 832). If there is an active breakpoint listed in the breakpoint list of the current partition for the instruction address of the call (step 830=YES), the state of the virtual processor that encountered the breakpoint is saved (step 840), all other virtual processors on the logical partition where the breakpoint occurred are halted (step 850), and the user is notified of the breakpoint via the user interface (step 860). The user may then perform any appropriate debug functions (step 870), such as single-stepping, examining and changing memory, setting new breakpoints, etc. Note that a variation of step 850 may stop less than all virtual processors of the logical partition of the breakpoint.

Figure 9:
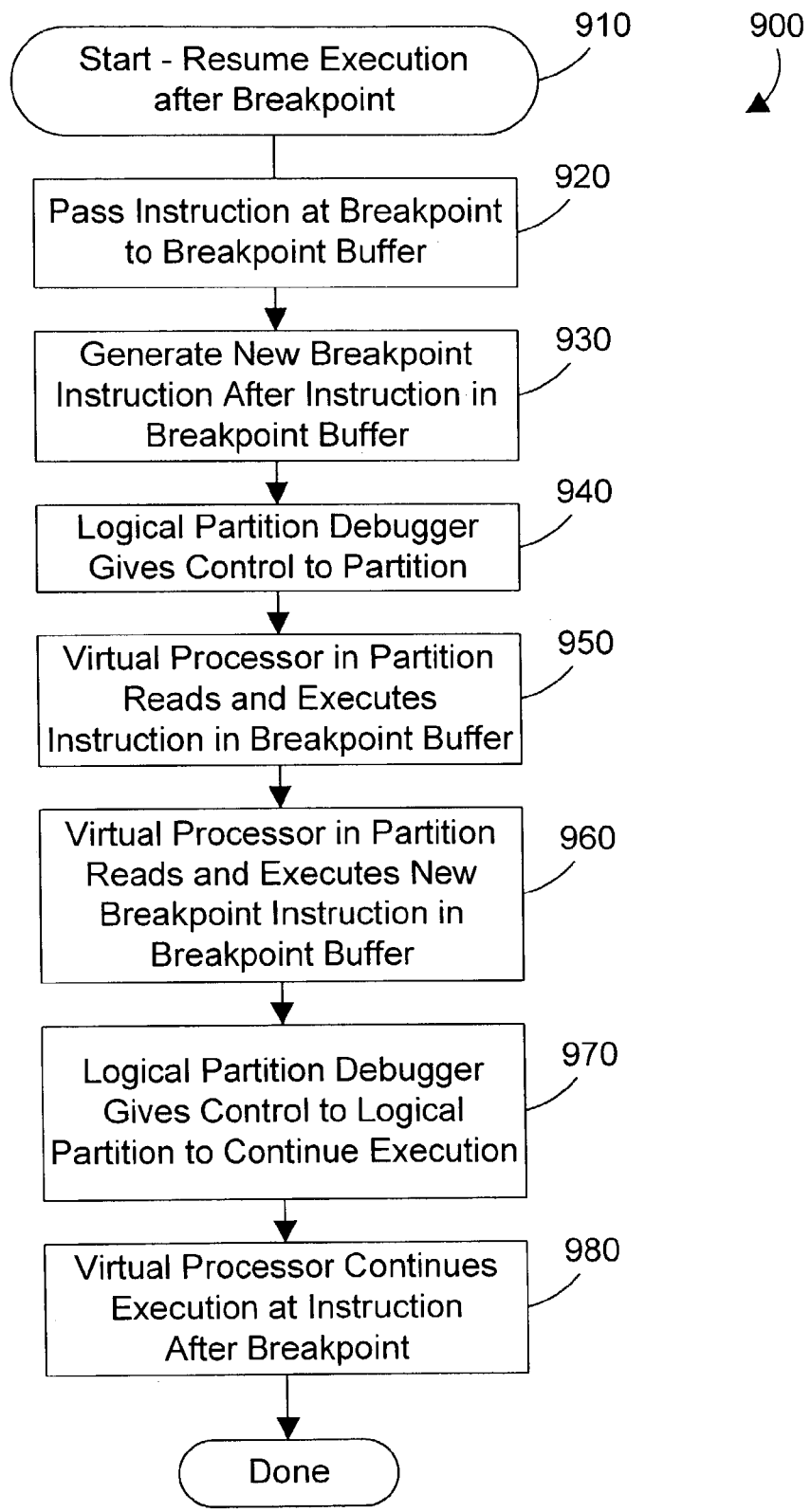
FIG. 9 is a flow diagram of a method in accordance with the preferred embodiments for resuming execution after a breakpoint instruction in a target partition is executed.

After halting a virtual processor because of an instruction breakpoint, it is often desirable to allow the virtual processor to continue to execute where it left off. Method 900 in FIG. 9 shows the steps performed when it is desired to resume execution after a breakpoint (step 910). Recall that the instruction that caused the breakpoint was the call to the partition manager that was substituted for the real instruction. Also recall that the real instruction was recorded at step 750 in FIG. 7. At this point, the partition that was halted by the breakpoint needs to execute that instruction. To accomplish this, one or more breakpoint buffers 202 are defined for each logical partition 125, as shown in FIG. 2. In the preferred embodiments, there is one breakpoint buffer for each addressing mode of the processor. The breakpoint buffers 202 are needed because the logical partition debugger executes outside the address space of the partitions being debugged. The instruction has to execute in the addressing context of the target partition. These breakpoint buffers provide a way for the logical partition debugger to pass instructions (such as the stored instruction that was replaced by the breakpoint call to the logical partition) to the partition for execution in the partition's environment. First, the logical partition debugger passes the stored instruction to the breakpoint buffer (step 920). Next, a new breakpoint instruction is generated and written to the breakpoint buffer (step 930). The logical partition debugger then gives control to the partition (step 940). The virtual processor in the partition then reads and executes the instruction in the breakpoint buffer (step 950), followed by executing the new breakpoint instruction (step 960). The logical partition debugger then gives control to the logical partition to continue execution (step 970). The virtual processor then continues execution at the instruction after the breakpoint (step 980). In this manner, the instruction may be stored by the logical partition debugger while setting up a breakpoint (by substituting a call to the partition manager for the instruction), but may be later executed within the logical partition environment by passing the instruction to the logical partition for execution.

Figure 10:
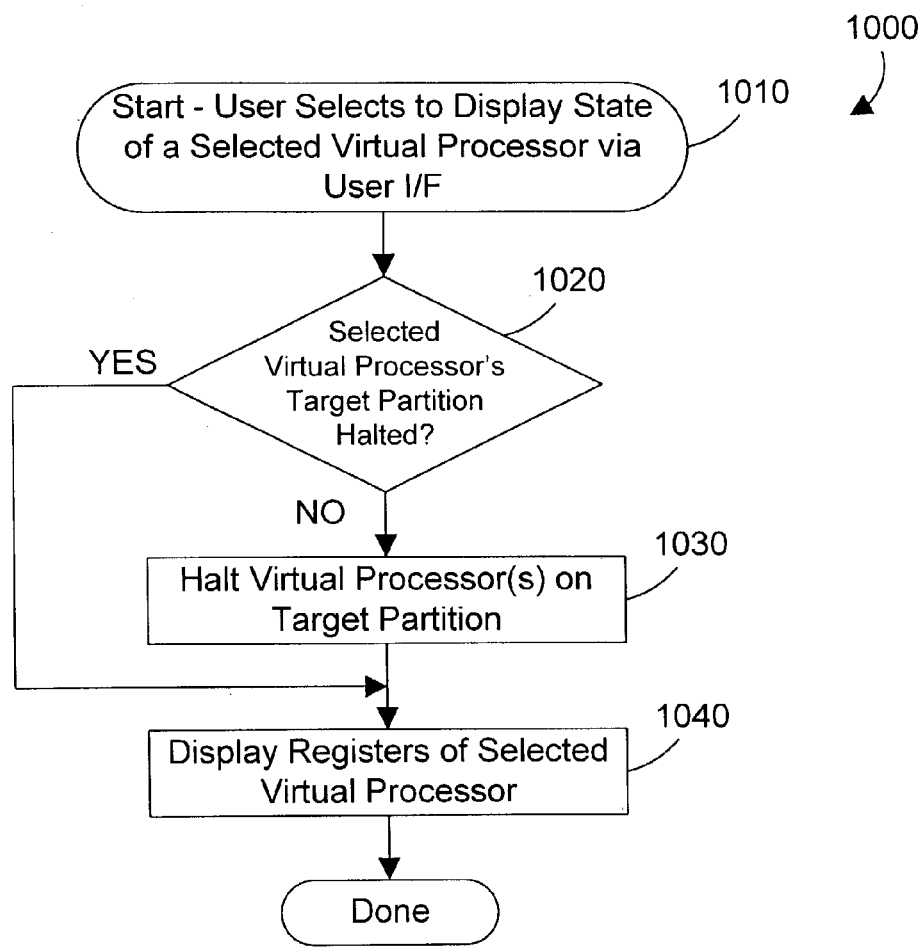
FIG. 10 is a flow diagram of a method in accordance with the preferred embodiments for displaying the state of a selected virtual processor.

The virtual processor state display mechanism 240 of FIG. 2 preferably performs the steps in method 1000 shown in FIG. 10. Method 1000 begins when a user selects to display the state of a selected virtual processor via the user interface (step 1010). Note that method 1000 could also be automatically started in response to processing a breakpoint so the state of a virtual processor is displayed automatically when the breakpoint is hit. If the target partition corresponding to the selected virtual processor is already halted (step 1020=YES), the registers of the selected virtual processor are displayed (step 1040). If the target partition corresponding to the selected virtual processor is not halted (step 1020=NO), the virtual processor(s) on the target partition are halted (step 1030), after which the registers of the selected virtual processor may be displayed (step 1040). Note that the halting of virtual processors in step 1030, may be performed by invoking method 500 in FIG. 5.

The instruction stepping mechanism 250 in FIG. 2 may use some of the functions already discussed. For example, single stepping may be implemented as a special case of setting a breakpoint and emulating branch instructions. A breakpoint is defined at an instruction using method 700 in FIG. 7. When the breakpoint is encountered in method 800 of FIG. 8, a new breakpoint is automatically set to the following instruction, and the stored instruction of the last breakpoint and the new breakpoint instruction is passed to the partition via its breakpoint buffer, as shown in method 900 of FIG. 9. This process may be repeated as needed to execute any suitable number of instructions in single-step fashion.

The branch emulation mechanism 260 allows the logical partition debugger to emulate a branch. Emulation of a branch is required for the logical partition debugger to maintain control over the execution of instructions. The logical partition debugger computes the address of the next instruction when it is stepping a "branch" instruction. The virtual processor will execute that instruction at the computed address. In this manner, the branch is emulated by the branch emulation mechanism 260.

Figure 11:
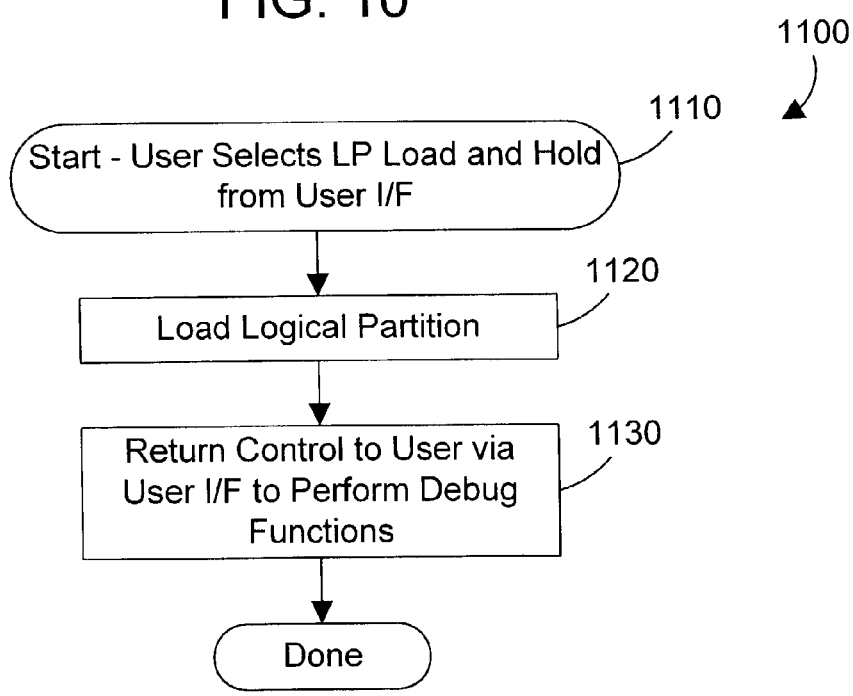
FIG. 11 is a flow diagram of a method in accordance with the preferred embodiments for loading a logical partition without starting any of its virtual processors to allow for debugging the logical partition as it boots.

The logical partition load and hold mechanism 270 preferably performs the steps in method 1100 in FIG. 11. The logical partition load and hold mechanism 270 allows a logical partition to be loaded, but no virtual processors are started. This allows debug functions to be performed as the operating system corresponding to a logical partition loads. Method 1100 begins when the user selects a logical partition load and hold function from the user interface (step 1110). The logical partition is loaded (step 1120). Control is then returned to the user via the user interface to perform debug functions (step 1130). The logical partition load and hold mechanism 270 thus performs a function that is unique to the debugging of a logically partitioned computer system. Because the logical partition debugger 123 resides within the partition manager 121, it may be executed after the partition manager is active but before any partitions are loaded. The logical partition load and hold mechanism 270 is thus a great tool in debugging failures in the boot sequence of a logical partition.

Figure 12:
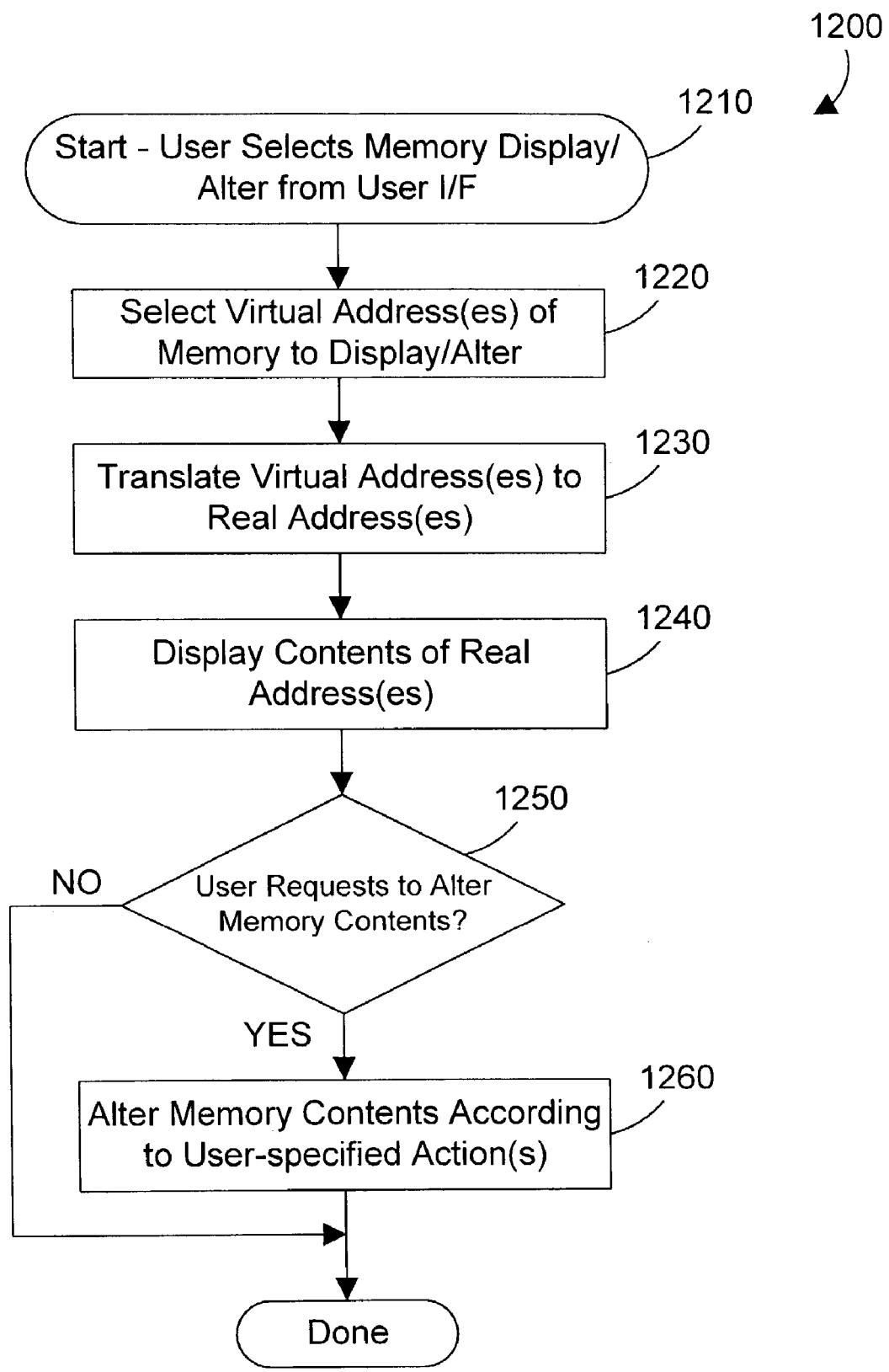
FIG. 12 is a flow diagram of a method in accordance with the preferred embodiments for displaying memory to a user and allowing the user to alter the memory.

The memory display/alter mechanism 280 in FIG. 2 preferably performs method 1200 shown in FIG. 12. Method 1200 begins when a user selects a memory display/alter function via the user interface (step 1210). Note that method 1200 could also begin automatically in response to a suitable debug function, such as the processing of a breakpoint. In either case, the virtual address(es) of memory to display/alter are selected (step 1220). The virtual address(es) are translated to corresponding real address(es) using the address translation tables in the partition manager (step 1230). The contents of the real addresses are then displayed (step 1240). If the user does not request to alter the memory contents (step 1250=NO), method 1200 is done. If the user requests to alter the memory contents (step 1250=YES), the user is allowed to alter the memory contents (step 1260).

The register display/alter mechanism 290 in FIG. 2 allows a user to display and alter the registers of any virtual processor. A user specifies a virtual processor, and the contents of the registers for that virtual processor is displayed. If the user desires to alter the register contents, the user may do so.

The logical partition debugger discussed herein is one suitable example of a debug mechanism within the scope of the preferred embodiments. A debug mechanism of the preferred embodiments preferably executes external to the logical partitions, and allows performing debug functions on a logical partition without affecting the other logical partitions on the system. In this manner, a single logical partition may be debugged without affecting the operation or performance of the other logical partitions.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

What is claimed is:

1. An apparatus comprising:
   at least one processor;
   a memory coupled to the at least one processor;
   a plurality of logical partitions defined on the apparatus; and
   a debug mechanism residing in the memory and executed by the at least one processor external to the plurality of logical partitions, the debug mechanism performing at least one debug function for one of the plurality of logical partitions without halting execution of other logical partitions, wherein the debug mechanism comprises a logical partition load and hold mechanism that loads the one logical partition without starting any processor corresponding to the one logical partition.

2. The apparatus of claim 1 wherein the debug mechanism includes a user interface that allows a user to specify the at least one debug function.

3. The apparatus of claim 1 wherein the debug mechanism is executed by a partition manager that manages the plurality of logical partitions.

4. The apparatus of claim 1 further comprising a breakpoint buffer residing in the one logical partition that allows the debug mechanism to pass at least one instruction to the one logical partition for execution by the one logical partition.

5. The apparatus of claim 1 wherein the debug mechanism comprises a virtual processor staff/stop mechanism that stops at least one virtual processor of the one logical partition without affecting virtual processors of other logical partitions.

6. The apparatus of claim 5 wherein the virtual processor start/stop mechanism starts at least one virtual processor of the one logical partition without affecting virtual processors of other logical partitions.

7. The apparatus of claim 1 wherein the debug mechanism comprises an instruction breakpoint mechanism that stops execution of at least one virtual processor of the one logical partition at a specified instruction without affecting virtual processors of other logical partitions.

8. The apparatus of claim 1 wherein the debug mechanism comprises a virtual processor state display mechanism that displays state information for a specified virtual processor.

9. The apparatus of claim 1 wherein the debug mechanism comprises an instruction stepping mechanism that allows one instruction in the one logical partition to be executed and that halts execution after the one instruction is executed.

10. The apparatus of claim 1 wherein the debug mechanism comprises a branch emulation mechanism that emulates a branch in the one logical partition.

11. The apparatus of claim 1 wherein the debug mechanism comprises a memory display/alter mechanism that displays memory contents to a user and allows the user to alter the contents of the memory.

12. An apparatus comprising:
at least one processor;
a memory coupled to the at least one processor;
a plurality of logical partitions defined on the apparatus, each logical partition including at least one breakpoint buffer;
a partition manager executed by the at least one processor that manages the plurality of logical partitions, the partition manager including a debug mechanism comprising:
    a user interface that allows a user to specify at least one debug function;
    a virtual processor start/stop mechanism that stops at least one virtual processor of one of the plurality of logical partitions without affecting virtual processors of other logical partitions, and that starts at least one virtual processor of the one logical partition without affecting virtual processors of other logical partitions;
    an instruction breakpoint mechanism that stops execution of at least one virtual processor of the one logical partition at a specified instruction without affecting virtual processors of other logical partitions, and that resumes execution by passing at least one instruction to the one logical partition via the at least one breakpoint buffer corresponding to the logical partition;
    a virtual processor state display mechanism that displays state information for a specified virtual processor;
    an instruction stepping mechanism that allows one instruction in the one logical partition to be executed and that halts execution after the one instruction is executed;
    a branch emulation mechanism that emulates a branch in the one logical partition;
    a logical partition load and hold mechanism that loads the one logical partition without starting any processor corresponding to the one logical partition; and
    a memory display/alter mechanism that displays memory contents to a user via the user interface and allows the user to alter the contents of the memory.

13. A computer-implemented method for debugging a computer system that includes a plurality of logical partitions, the method comprising the steps of:
executing a debug mechanism external to the plurality of logical partitions;
using the debug mechanism to perform at least one debug function for one of the plurality of logical partitions without halting execution of other logical partitions; and
using the debug mechanism to load the one logical partition without starting any processor corresponding to the one logical partition.

14. The method of claim 13 wherein the debug mechanism includes a user interface that allows a user to specify the at least one debug function.

15. The method of claim 13 wherein the debug mechanism is executed by a partition manager that manages the plurality of logical partitions.

16. The method of claim 13 further comprising the step of the debug mechanism passing at least one instruction to a breakpoint buffer residing in the one logical partition for execution by the one logical partition.

17. The method of claim 13 further comprising the step of stopping at least one virtual processor of the one logical partition without affecting virtual processors of other logical partitions.

18. The method of claim 17 further comprising the step of starting at least one virtual processor of the one logical partition without affecting virtual processors of other logical partitions.

19. The method of claim 13 further comprising the step of stopping execution of at least one virtual processor of the one logical partition at a specified instruction without affecting virtual processors of other logical partitions.

20. The method of claim 13 further comprising the step of displaying state information for a specified virtual processor.

21. The method of claim 13 further comprising the step of executing one instruction in the one logical partition and halting execution after the one instruction is executed.

22. The method of claim 13 further comprising the step of emulating a branch in the one logical partition.

23. The method of claim 13 further comprising the steps of:
displaying memory contents to a user; and
allowing the user to alter the contents of the memory.

24. A computer-implemented method for debugging a computer system that includes a plurality of logical partitions, the method comprising the steps of:
(1) executing a debug mechanism external to the plurality of logical partitions;
(2) using the debug mechanism to perform at least one of the following steps:
    (2A) passing at least one instruction to a breakpoint buffer residing in one of the plurality of logical partitions for execution by the one logical partition;
    (2B) stopping at least one virtual processor of the one logical partition without affecting virtual processors of other logical partitions;
    (2C) starting at least one virtual processor of the one logical partition without affecting virtual processors of other logical partitions;

(2D) stopping execution of at least one virtual processor of the one logical partition at a specified instruction without affecting virtual processors of other logical partitions;
(2E) displaying state information for a specified virtual processor;
(2F) executing one instruction in the one logical partition and halting execution after the one instruction is executed;
(2G) emulating a branch in the one logical partition;
(2H) loading the one logical partition without starting any processor corresponding to the one logical partition;
(2I) displaying memory contents to a user; and
(2J) allowing the user to alter the contents of the memory.

25. A computer readable program product comprising:
a debug mechanism that performs at least one debug function for one of a plurality of logical partitions in a logically partitioned computer system without halting execution of other logical partitions, wherein the debug mechanism comprises a logical partition load and hold mechanism that loads the one logical partition without starting any processor corresponding to the one logical partition; and
recordable media bearing the debug mechanism.

26. The program product of claim 25 wherein the debug mechanism includes a user interface that allows a user to specify the at least one debug function.

27. The program product of claim 25 wherein the debug mechanism is executed by a partition manager that manages the plurality of logical partitions.

28. The program product of claim 25 wherein the debug mechanism comprises a mechanism to pass at least one instruction to a breakpoint buffer in the one logical partition for execution by the one logical partition.

29. The program product of claim 25 wherein the debug mechanism comprises a virtual processor start/stop mechanism that stops at least one virtual processor of the one logical partition without affecting virtual processors of other logical partitions.

30. The program product of claim 29 wherein the virtual processor start/stop mechanism starts at least one virtual processor of the one logical partition without affecting virtual processors of other logical partitions.

31. The program product of claim 25 wherein the debug mechanism comprises an instruction breakpoint mechanism that stops execution of at least one virtual processor of the one logical partition at a specified instruction without affecting virtual processors of other logical partitions.

32. The program product of claim 25 wherein the debug mechanism comprises a virtual processor state display mechanism that displays state information for a specified virtual processor.

33. The program product of claim 25 wherein the debug mechanism comprises an instruction stepping mechanism that allows one instruction in the one logical partition to be executed and that halts execution after the one instruction is executed.

34. The program product of claim 25 wherein the debug mechanism comprises a branch emulation mechanism that emulates a branch in the one logical partition.

35. The program product of claim 25 wherein the debug mechanism comprises a memory display/alter mechanism that displays memory contents to a user and allows the user to alter the contents of the memory.

36. A computer readable program product comprising:
(A) a partition manager that manages a plurality of logical partitions in a logically partitioned computer system, the partition manager including a debug mechanism comprising:
a user interface that allows a user to specify at least one debug function;
a virtual processor start/stop mechanism that stops at least one virtual processor of one of the plurality of logical partitions without affecting virtual processors of other logical partitions, and that starts at least one virtual processor of the one logical partition without affecting virtual processors of other logical partitions;
an instruction breakpoint mechanism that stops execution of at least one virtual processor of the one logical partition at a specified instruction without affecting virtual processors of other logical partitions, and that resumes execution by passing at least one instruction to the one logical partition via at least one breakpoint buffer corresponding to the logical partition;
a virtual processor state display mechanism that displays state information for a specified virtual processor;
an instruction stepping mechanism that allows one instruction in the one logical partition to be executed and that halts execution after the one instruction is executed;
a branch emulation mechanism that emulates a branch in the one logical partition;
a logical partition load and hold mechanism that loads the one logical partition without starting any processor corresponding to the one logical partition; and
a memory display/alter mechanism that displays memory contents to a user via the user interface and allows the user to alter the contents of the memory; and
(B) recordable media bearing the partition manager.

* * * * *